United States Patent [19]
Webb

[11] Patent Number: 5,746,454
[45] Date of Patent: May 5, 1998

[54] PIPE COUPLING ASSEMBLY

[75] Inventor: Michael C. Webb, Chester Springs, Pa.

[73] Assignee: Environ Products, Inc., Exton, Pa.

[21] Appl. No.: 685,775

[22] Filed: Jul. 24, 1996

Related U.S. Application Data

[63] Continuation of Ser. No. 306,680, Sep. 15, 1994, abandoned.

[51] Int. Cl.$^6$ ............................................. F16L 55/00
[52] U.S. Cl. ..................... 285/92; 285/123.12; 285/354; 285/331
[58] Field of Search ........................ 285/133.1, 92, 285/23, 354, 386, 331, 387, 388, 123.1, 123.6, 123.12

[56] References Cited

U.S. PATENT DOCUMENTS

| | | | |
|---|---|---|---|
| 2,794,658 | 6/1957 | Purkhiser | 285/133.1 X |
| 3,980,112 | 9/1976 | Basham | 285/113.1 X |
| 4,616,676 | 10/1986 | Adams et al. | 285/133.1 X |
| 4,732,414 | 3/1988 | Inaba . | |
| 4,805,444 | 2/1989 | Webb . | |
| 4,870,856 | 10/1989 | Sharp . | |
| 4,886,305 | 12/1989 | Martin . | |
| 4,922,971 | 5/1990 | Grantham | 285/133.1 X |
| 4,932,257 | 6/1990 | Webb . | |
| 4,971,477 | 11/1990 | Webb et al. | 405/154 |
| 5,005,613 | 4/1991 | Stanley . | |
| 5,016,920 | 5/1991 | Anderson | 285/92 X |
| 5,042,290 | 8/1991 | Geisinger . | |
| 5,090,234 | 2/1992 | Maresca, Jr. et al. . | |
| 5,127,679 | 7/1992 | Pouplier | 285/92 |
| 5,156,421 | 10/1992 | Chauvel | 285/92 X |
| 5,157,958 | 10/1992 | Geisinger . | |
| 5,163,314 | 11/1992 | Maresca, Jr. et al. . | |
| 5,188,398 | 2/1993 | Parimore, Jr. et al. | 285/92 X |
| 5,215,336 | 6/1993 | Worthing | 285/92 X |
| 5,220,822 | 6/1993 | Tuma . | |
| 5,256,651 | 10/1993 | Sharp | 285/133.1 |
| 5,263,794 | 11/1993 | Webb | 405/52 |
| 5,297,896 | 3/1994 | Webb | 405/52 |
| 5,301,721 | 4/1994 | Hartmann . | |
| 5,317,899 | 6/1994 | Hutchinson . | |
| 5,343,191 | 8/1994 | Mcatemney . | |
| 5,343,738 | 9/1994 | Skaggs . | |
| 5,384,714 | 1/1995 | Kidd . | |
| 5,390,532 | 2/1995 | Anthony . | |
| 5,398,977 | 3/1995 | Berger . | |
| 5,408,420 | 4/1995 | Slocum et al. . | |
| 5,450,883 | 9/1995 | Payne et al. . | |
| 5,456,502 | 10/1995 | Sharp . | |

FOREIGN PATENT DOCUMENTS

| | | | |
|---|---|---|---|
| 1276007 | 10/1961 | France | 285/133.1 |
| 1 234 163 | 1/1967 | Germany . | |
| 2249449 | 4/1974 | Germany | 285/133.1 |
| WO/9004157 | 9/1990 | WIPO . | |

*Primary Examiner*—Terry Lee Melius
*Assistant Examiner*—Heather Shackelford
*Attorney, Agent, or Firm*—Seidel Gonda Lavorgna & Monaco, PC

[57] ABSTRACT

A pipe coupling assembling for use with a pipe having an inner wall, an outer wall and an interstitial space between the walls, with the pipe terminating in a coupling end defining an axial direction. The assembly includes a ferrule attached to the outer wall. The ferrule has an outer annular ring and an interstitial channel aligned with the interstitial space in the pipe for presenting an interstitial chamber. An insert is attached to the inner wall. The insert also has an inner annular ring. An externally threaded transition fitting is removed for attachment to the ferrule. The fitting includes an interstitial channel aligned with the interstitial chamber, an outer seal channel for sealing engagement with the outer annular ring, and an inner seal channel for sealing engagement with the inner annular ring. Finally, a coupling is keyed to the ferrule including internal threads for engagement with the fitting to provide coupling engagement between both the ferrule and the insert with the fitting.

20 Claims, 5 Drawing Sheets

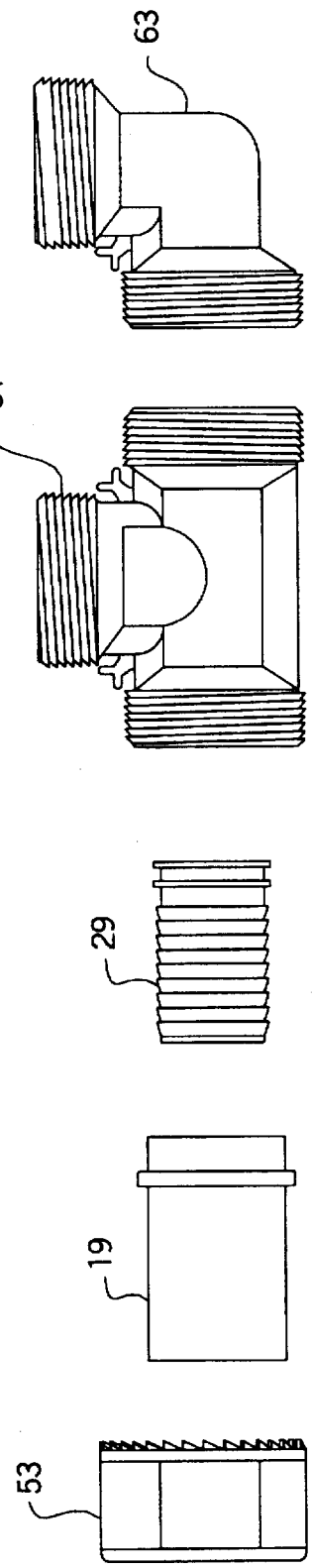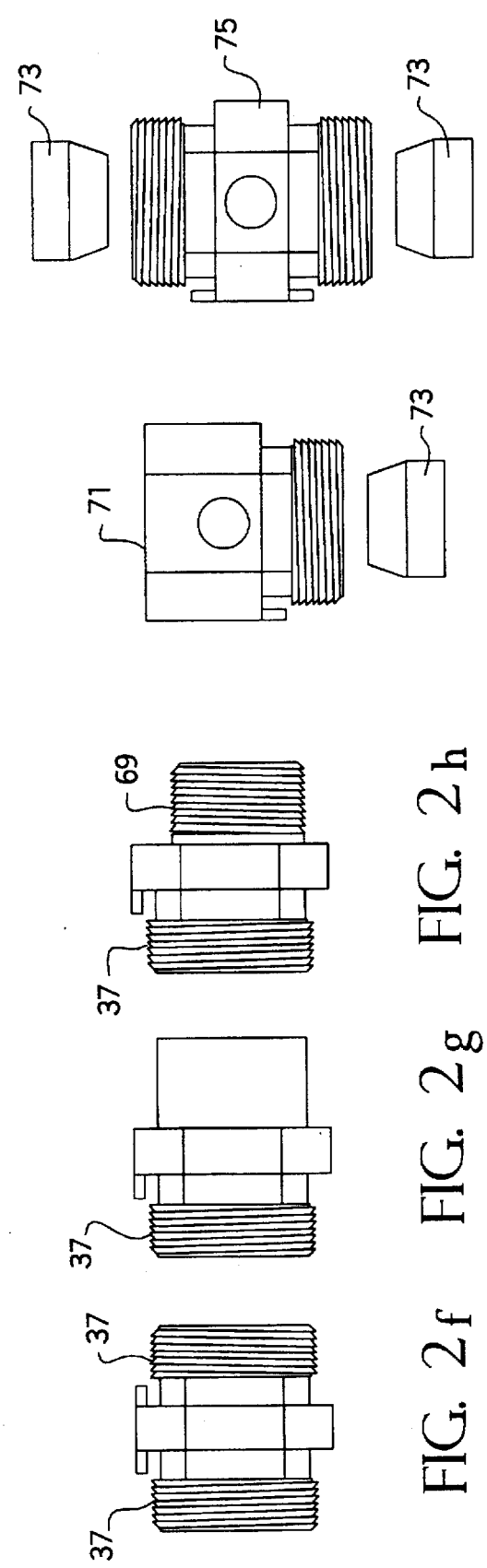

PIPE COUPLING ASSEMBLY

This application is a continuation of Ser. No. 08/306,680, filed Sep. 15, 1994 now abandoned.

FIELD OF THE INVENTION

This invention relates to transition coupling and fitting assemblies for connecting segment of pipes into systems. More particularly, the invention relates to an assembly for coupling coaxial pipes, such as flexible coaxial pipes, of the type used in environmentally conscious petroleum transfer systems.

BACKGROUND OF THE INVENTION

Because the petroleum equipment market is becoming more environmentally conscious, a significant shift has occurred from the use of rigid underground piping to the use of flexible piping. Rigid piping has a number of drawbacks, including the fact that it must be laid out accurately with precise angles using 90° elbows, 45° elbows and the like, even when the underground fuel storage tanks and pumps are not aligned properly with respect to each other. A primary reason for this shift from rigid to flexible piping is that flexible piping has many fewer pipe connections than rigid systems, since the flexible system can accommodate virtually any orientation of the pumps and tanks. With fewer pipe connections, the piping system is perceived by the industry to be more environmentally safe.

In addition to the environmental concerns, flexible underground piping systems have also gained in popularity because these systems are more easily installed than rigid piping systems. Rigid systems require on-site measurements and cutting of each piece, along with the labor involved in making two pipe connections every time the piping undergoes a change in direction. In some cases, flexible underground piping systems have been installed at a lower total cost than that of conventional rigid piping systems.

As part of the development of underground piping systems, it has been found necessary to provide a means of secondary containment for both the primary piping and for associated fittings in order to provide a margin of safety in case of leaks or damage to the system. A secondary containment pipe offers external protection for the primary supply pipe and, further, provides for a method of containing the fluid from the primary pipe in the event of a rupture or leak. Presently, there are several types of double wall flexible piping systems on the market. These include systems with a small flexible pipe housed in a larger flexible containment pipe. One such system is described in U.S. Pat. No. 4,971,477, wherein access chambers are separated by a secondary containment pipe which in turn is sized to accept a primary pipe into the interior of the secondary containment pipe. This system has a number of drawbacks, including the fact that the primary and secondary pipes are installed separately and that fittings are required for each of the two types of pipes. Moreover, because each of the pipes connects with an access chamber, a rapid and simple method of monitoring the condition of the piping would not be possible.

As can be seen from the above referenced U.S. Pat. No. 4,971,477, flexible piping and the secondary containment, at least as described therein, requires a sump or access chamber each time sections of the flexible pipe are joined together. Most other systems also require a sump at each location where sections of flexible pipe are joined together. Other systems which have met with some degree of success using coaxial pipes and a secondary containment are shown in U.S. Pat. Nos. 5,263,794 and 5,297,896. In these systems, the advantages of flexible pipe systems can be seen. Nevertheless, it is still necessary to make individual connections each time sections of pipes are joined together.

There are several considerations that need to be addressed in designing connections between sections of pipes particularly flexible coaxial pipes. First, it is generally desirable to avoid connecting plastic to plastic, since vibration and time will cause a flow of the plastic material and a really effective connection is not always secured. A much better seal is achieved when metal and plastic are joined together since the metal does not melt or flow and the plastic tends to accommodate itself to the metal. However, in these cases it is necessary to protect the metal from the environment to avoid an otherwise potentially corrosive and unsafe condition. Coatings on metal often times peel off or become damaged during handling of the metal parts. Also, if the coatings are sufficiently thick, the contact of the metal on plastic to form a seal is lost.

As will be apparent from reviewing the above cited patents, there is an interstitial space between the inner primary supply pipe and the outer secondary containment pipe. This interstitial space in the past has been used as a means for transferring leaked fluid into the containment sump or access chamber. Typically, in early systems, the access chambers were inspected on a regular basis to see if quantities of fluid had collected. This of course does not provide a rapid response to a major leak of fluid such as fuel from the primary supply pipe.

As shown in U.S. Pat. Nos. 5,263,794 and 5,297,896, the entire system is connected so that the primary pipe functions as a closed system, transporting fuel from the supply tank to the various dispensers. However, the interstitial space between the primary supply pipe and the secondary containment pipe is, at least in U.S. Pat. No. 4,971,477, merely a conduit allowing leakage to flow to an access chamber for observation. Although it is possible to monitor the conditions of one or all of the access chambers, by inspection, for example, no simple method of monitoring the entire system is possible.

Accordingly, a principal object of the present invention is to provide an underground piping system which employs coaxial pipe such as those pipes described above which include a primary supply pipe and a secondary containment pipe, in which the interstitial space between the two pipes can be connected to an interstitial spaces in other segments of piping to form a continuous closed system of interstitial space.

Another object of this invention is to provide a coupling assembly for use with coaxial pipes which permits coupling of the interstitial space between the coaxial pipes with a similar interstitial space in another segment of pipe.

Still another object of this invention is to provide a coupling assembly which facilitates connection of a plurality of coaxial pipes without the use of containment chambers or sumps.

Yet another object of this invention is to provide a coupling assembly in which the seal between the pipes is accomplished by a plastic on metal seal in a manner that protects the metal portion of the seal from exposure to the environment.

Other object will appear hereinafter.

SUMMARY OF THE INVENTION

It has now been discovered that the above and other objects of the present invention may be accomplished in the following the manner. Specifically, an improved pipe coupling assembly has been discovered which permits junction of variety of pipes, particularly those having an inner wall, an outer wall and an interstitial space between those walls. The pipe coupling assembly attaches to these pipe at the coupling end of the pipe and thereby defines a direction of flow from the pipe to the next part of the system.

The coupling assembly includes a ferrule attached to the outer wall of the pipe at the coupling end. The ferrule has an outer annular ring extending from the coupling end of the pipe in the axial direction of flow. The ferrule also has an interstitial channel which is aligned with the interstitial space of an axial pipe to define and present an interstitial chamber at the coupling end for communication with other interstitial regions.

The assembly further includes an insert, preferably metal, which is attached to the inner wall of the pipe at its coupling end. The insert which is expanded into the inner pipe walls, includes an inner annular ring extending from the coupling end of the pipe in the direction of flow.

The second component of the coupling assembly is an externally threaded transition fitting which is to be attached to the ferrule. The transition fitting includes an interstitial channel which is aligned with the interstitial chamber of the ferrule. The fitting further includes an outer seal channel for sealing engagement with the outer annular ring on the ferrule. The transition fitting still further includes an inner seal channel for sealing engagement with the inner annular ring on the metal insert. By bringing the transition fitting into contact with the ferrule and insert, a metal to plastic seal is achieved. Moreover, the interstitial space from the pipe through the ferrule to the fitting is effectively sealed by the interaction of the annular rings and the sealed chambers.

A final component of the coupling assembly is a coupling means for locking the coupling such as a swivel nut, which is keyed to the ferrule to prevent removal in the axial flow direction, although it may be removable in the opposite direction from the axial flow.

BRIEF DESCRIPTION OF THE DRAWINGS

These and other objects of the present invention and the various features and details of the operation and construction thereof are hereinafter more fully set forth with reference to the accompanying drawings, where:

FIGS. 2A through 2J are side elevational views of the various components of the invention, illustrating optional embodiments.

DETAILED DESCRIPTION OF THE PREFERRED EMBODIMENT

Figure 1:
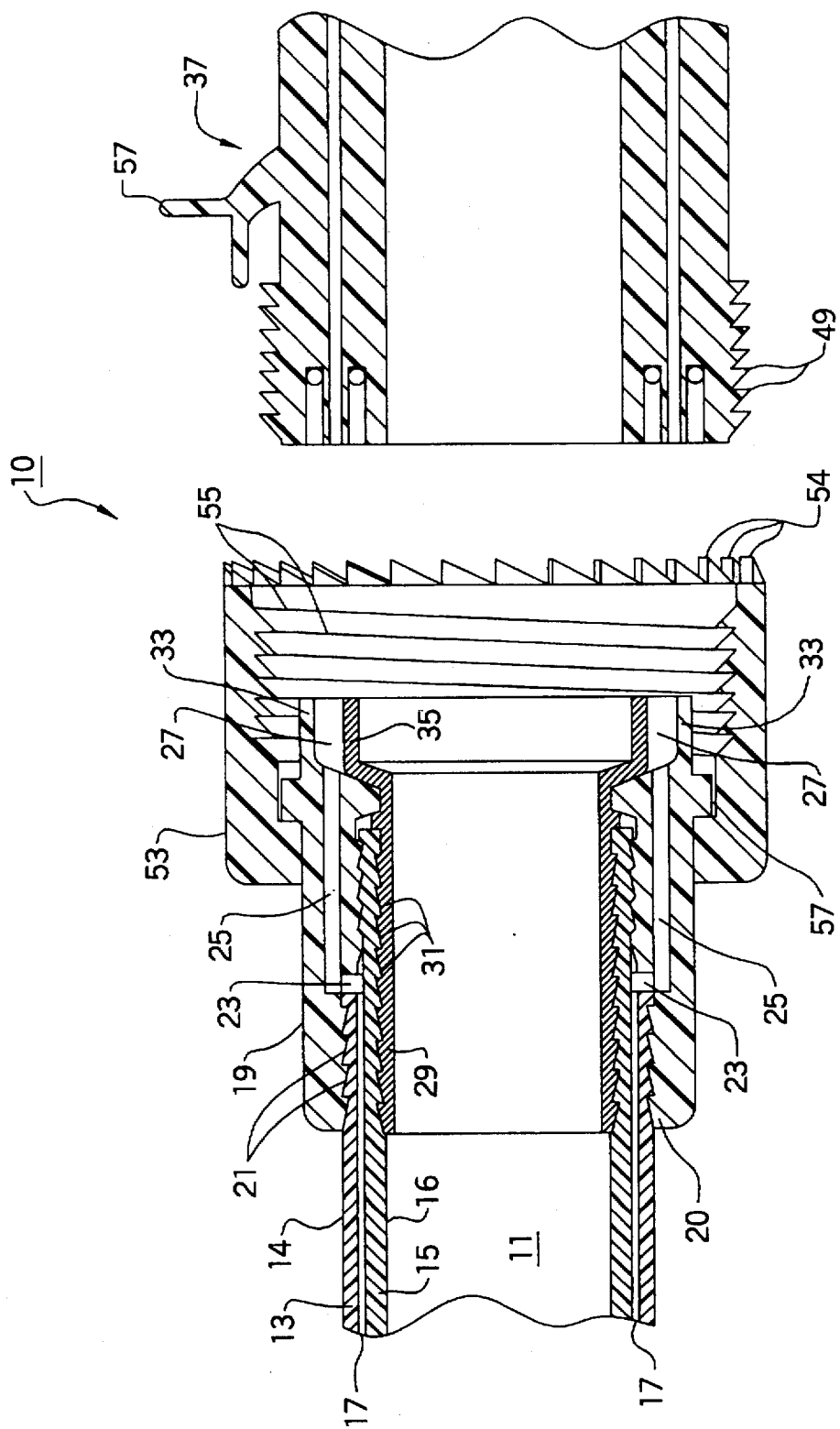
FIG. 1 is a sectional, side elevational schematic view of one embodiment of the present invention, shown in an uncoupled conditioned.

The pipe coupling assembly shown generally by reference numeral 10 in FIG. 1 includes a pipe 11 having a secondary stand-off jacket 13 and a primary supply pipe 15. Stand-off jacket 13 includes an outer wall 14 while the primary supply pipe 15 includes an inner wall 16. Located between the primary supply pipe 15 and the stand-off jacket 13 is an interstitial space 17 which may take various forms but is generally an axially aligned space between two walls in which fluids may flow from one end of the pipe to the other end without restriction. It is intended, for the purposes of this invention, that the interstitial space 17 permit communication between the two ends of the pipe 11, and therefore is a generally axially aligned passageway. If physical structure is used to define the interstitial space 17, such as by axially aligned spacing members or helically wound spacing members, all that is required is that the space extend between the two ends of the pipe. In some instances, the supply pipe 15 and secondary stand-off jacket 13 will comprise a first pipe within a second pipe without any additional structure separating them. As long as the inner pipe has a smaller outer diameter than the inner diameter of the larger pipe, an interstitial space will exist in the regions where the two pipes are not in direct contact.

The preferred pipe is disclosed in my previously identified patent, U.S. Pat. No. 5,297,896. However, any axial pipe, solid or flexible, may be employed with the couplings of the present invention.

FIG. 1 also shows a plastic ferrule 19 attached to the outer wall 14 of the secondary jacket 13 via circumferentially extending radial teeth 21 which engage the outer wall 14 for a secure attachment of ferrule 19 to the pipe 11 at the coupling end thereof. Ferrule 19 includes an enlarged cross section at region 20 to add to the strength of ferrule 19, such as when the ferrule 19 is inserted onto pipe 11. Thick region 20 strengthens the ferrule 19 and its component parts.

Ferrule 19 also includes radial ports or holes 23 for communication with the interstitial space 17 of pipe 11. The ports 23 communicate with interstitial channel 25 in the ferrule which in turn communicates with interstitial chamber 27.

Also forming part of the coupling assembly is an insert 29, usually formed of metal, and including teeth 31 which engage the inner walls 16 of primary pipe 15. Teeth 31 are expanded into the inner wall 16 by expansion of the metal inserts 29 as it is installed by internal expansion into the coupling end of pipe 11.

The interstitial chamber 27 is defined by the space between an outer annular ring 33 on ferrule 19 and an inner annular ring 35 on metal insert 29. Thus the interstitial chamber 27 communicating with the pipe interstitial space 17 is located between two annular rings which, when sealed as will be shown, preserves the integrity of the interstitial space 17.

Another part of the coupling assembly is a transition fitting 37 which mates with the plastic ferrule as will be described. Transition fitting 37 includes an interstitial channel 39 which will communicate with the interstitial chamber 27. The fitting 37 includes inner channel 41 and O-ring seal 43 which mates with the annular ring 35 on metal insert 29, thereby forming a primary supply pipe seal. Fluids contained within the pipe inside primary pipe 15 cannot pass through annular ring 35 when it has been inserted into the sealed channel 41 and in operable relationship with O-ring 43. Similarly, the fitting 37 includes a secondary jacket seal chamber 45 with O-ring 47 for engagement with the annular ring 33 on ferrule 19. The containment protection of secondary stand-off jacket 13 is maintained through transition fitting 37 by the insertion of the annular ring 33 into sealing channel 45 and contact with O-ring 47. When both annular rings 33 and 35 are inserted into seal channels 45 and 41 and are engaged with O-rings 43 and 47 the integrity of the interstitial space 17 is preserved through interstitial space 39 in the transition fitting.

Transition fitting 37 includes a plurality of threads 49 which permit threaded attachment to pipe 11 as will be described. Back-off restrictor 51 is also part of transition fitting 37. The plastic swivel nut 53 is attached to the coupling end of pipe 11, as shown in FIG. 1, and is provided with threads 55 which engage the threads 49 on fitting 37 to bring the two pieces into locking engagement. Plastic ferrule 19 includes an integrally formed annular ring 57 which serves as a key in nut 53 to limit the movement of swivel nut 53. Swivel nut 53 includes a plurality of teeth 54 which engage back-off restrictor 51 as will be described.

FIG. 2 illustrates a number of the fittings which are useful with the present invention. FIGS. 2A, 2B, and 2C illustrates the swivel nut 53, coupling ferrule 19 and coupling insert 29, respectfully. FIGS. 2D and 2E show a tee fitting and an elbow fitting respectfully, which are used as part of the overall pipe system. Tee fitting 61 is normally used at an intermediate fuel dispensing station while elbow fitting 63 is used at the end of the pipe line.

FIG. 2F illustrates a connector fitting which would be used to connect two pipes at some location in the piping system, with each side functioning as a transition fitting for one of the two pipes. FIG. 2G illustrates a female adapter having a transition fitting 37 on the left side and a threaded female adapter on the right side. Similarly, FIG. 2H illustrates a male adapter 69 on the right hand side of the adapter and a transition fitting 37 on the left hand side.

FIGS. 2I and 2J illustrate a shear valve adapter 71 and a riser adapter 75, with fittings 73, which may also be used in various combinations to accomplish the overall piping system goals. Of course, other conventional fittings may also be used with the present invention, as long as the components of the invention are present.

Figure 3:
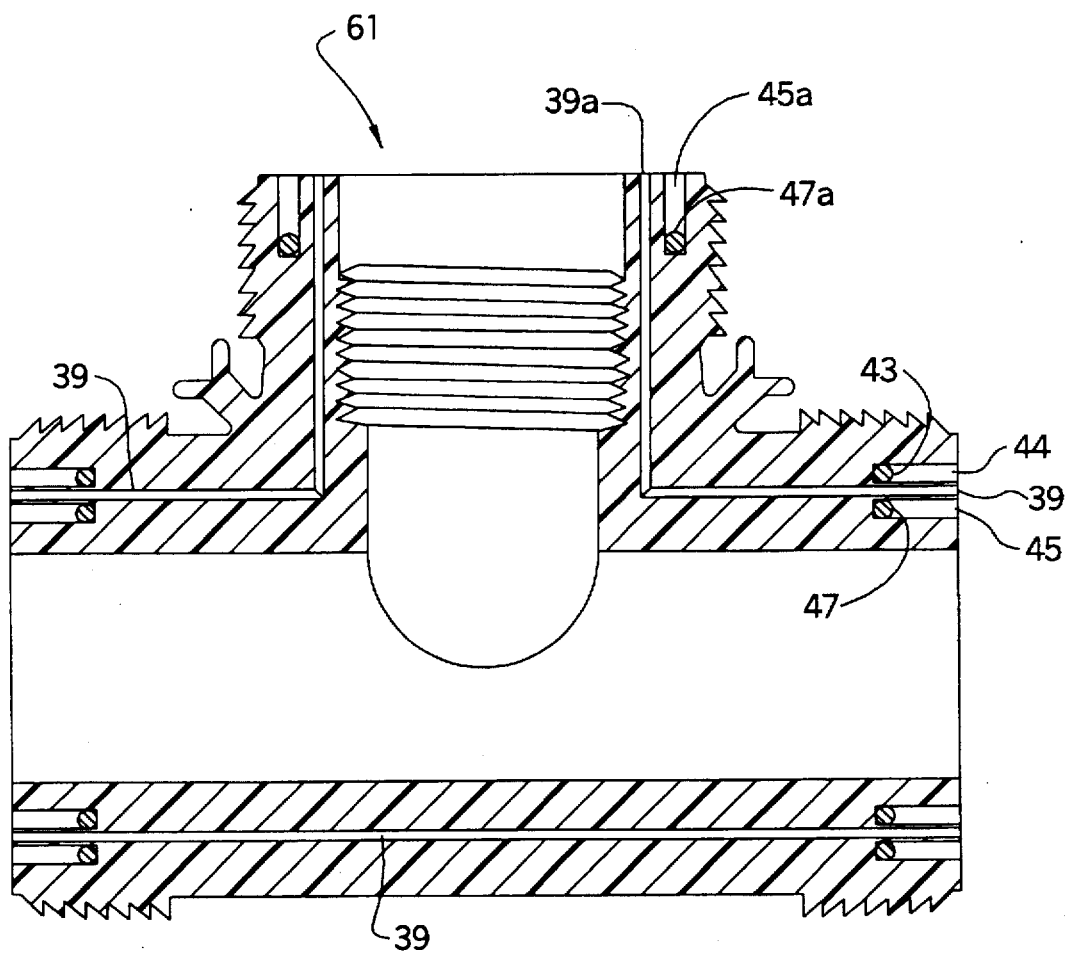
FIG. 3 is a sectional, side elevational view of an embodiment illustrating one specific feature of the invention.

Shown in FIG. 3 is an enlarged view of the tee fitting 61 shown in FIG. 2D. As can be seen, both sides of the tee are equipped to function as transition fittings, with interstitial channels 39 isolated and protected by seal channels 41 and 45 and O-ring seals 43 and 47. The vertical portion of tee fittings 61 is fitted with threads to receive a pipe, shown below, which can also be attached to the fitting and communication with interstitial channels 39A can be accomplished using seal channel 45A and O-ring 47A.

Figure 4:
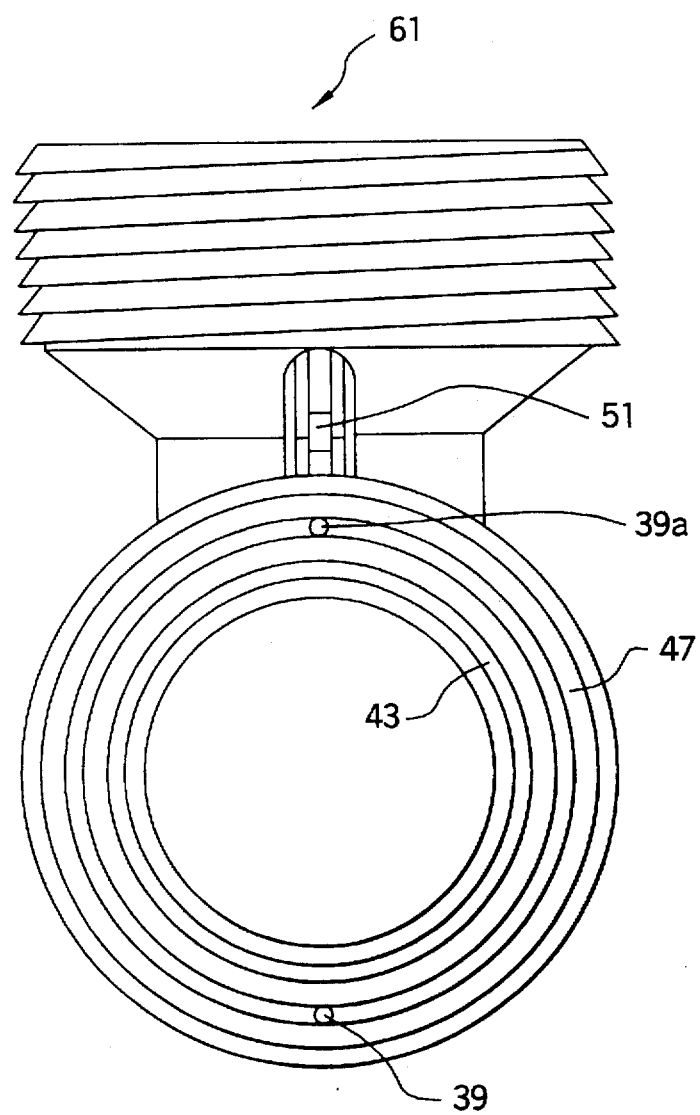
FIG. 4 is an end view of the device shown in FIG. 3.

Shown in FIG. 4 is an end view of the tee fitting 61 shown in FIG. 3. The interstitial spaces 39 and 39A are shown as being separated and protected by O-ring seals 43 and 47. The back-off restrictor 51 is adapted to engage a swivel nut, as will be described below.

Figure 5:
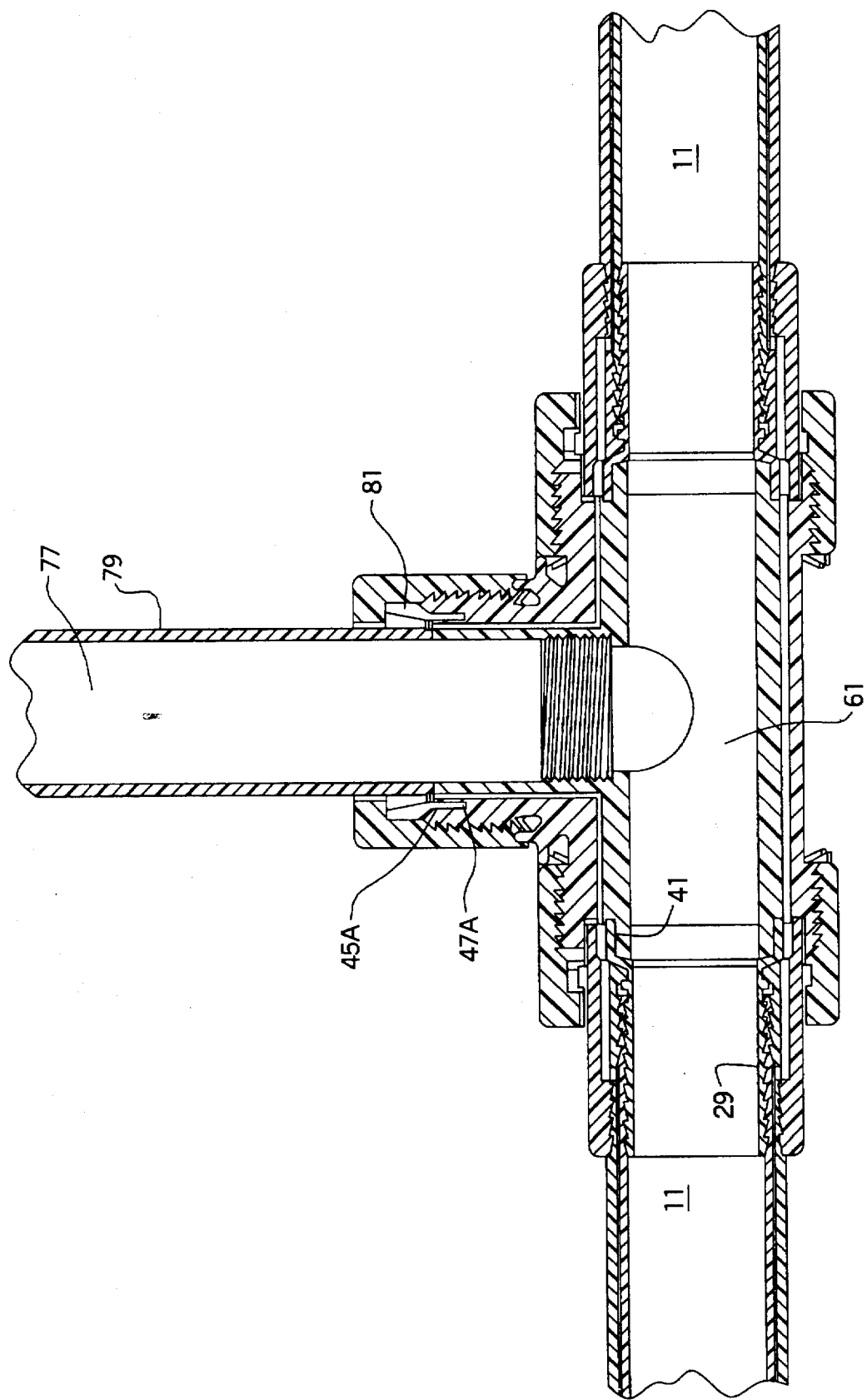
FIG. 5 is a sectional, side elevational view of the principal embodiment of the present invention, shown in a coupled condition.

Turning now to FIG. 5 a completed transition coupling assembly is shown wherein pipe 11 is connected at each end of tee fitting 61 while a steel riser pipe 77 is threaded into the vertical portion of tee 61. Steel riser pipe 77 includes a stand-off jacket 79 which permits the interstitial space between pipes 77 and jacket 79 to communicate with the interstitial space 39A. A swedge assembly 81 cooperatively engages channels 45A and O-ring seal 47A. Thus, if this system is employed in a gasoline distribution system at a service station, pipe 11 transmits gasoline from the storage tank to the various pumps through a plurality of tee fittings such as shown in FIG. 5, so that the individual pumps receive fluids. An elbow fitting such as elbow fitting 63 in FIG. 2 would be used at the end of the pipe path. Because the interstitial spaces in the pipes and coupling assemblies are all interconnected and protected by seals, it is possible to employ leak detecting systems which utilize this interstitial space to determine the presence of fluid between the primary pipe and the secondary or stand-off jacket containment pipe.

In each case where a pipes terminates and enters a coupling or another pipe, a plastic to metal seal is achieved via metal insert 29 and the primary seal channel 41.

While particular embodiments of the present invention have been shown in detail, it is to be understood that various modifications and variations will become apparent to one skilled in the art upon reading the foregoing disclosure.

Having thus, described the invention, what is claimed is:

1. A pipe coupling assembly, comprising:

a pipe having an inner wall, an outer wall and an interstitial space between said walls, said pipe terminating in a coupling end defining an axial direction;

a ferrule attached to said outer wall at said end, said ferrule having an outer annular ring extending from said coupling end in said direction and further having an interstitial channel aligned with said interstitial space in said pipe for presenting an interstitial chamber at said coupling end;

an insert attached to said inner wall at said end, said insert having an inner annular ring extending from said coupling end in said direction;

an externally threaded transition fitting for attachment to said ferrule, said fitting including an interstitial channel aligned with said interstitial chamber, an outer seal channel for sealing engagement with said outer annular ring, and an inner seal channel for sealing engagement with said inner annular ring; and coupling means keyed to said ferrule to prevent removal thereof in said direction and including internal threads for engagement with said fitting to provide coupling engagement between said ferrule and insert with said fitting.

2. The assembly of claim 1, wherein said insert is metal and said ferrule and said fitting are plastic, said insert being contained within said ferrule to prevent exposure of said metal insert when said assembly is in said coupling engagement.

3. The assembly of claim 2, wherein said metal insert is internally expanded into said inner wall.

4. The assembly of claim 1, wherein said coupling means is a plastic swivel nut.

5. The assembly of claim 1, wherein said inner seal channel includes an O-ring and said inner ring extends into said inner seal channel for sealing engagement with said O-ring.

6. The assembly of claim 1, wherein outer seal channel includes an O-ring and said outer ring extends into said outer seal channel for sealing engagement with said O-ring.

7. The assembly of claim 1, wherein said ferrule is attached to said outer wall using teeth means formed in said ferrule for deformational engagement with said outer wall.

8. The assembly of claim 1, wherein said insert is attached to said inner wall using teeth means formed in said insert for deformational engagement with said inner wall upon expansion of said insert.

9. The assembly of claim 1, which further includes back-off restrictor means for engaging said coupling means to prevent movement of said coupling means due to vibrations.

10. The assembly of claims 1, wherein said transitional fittings include means for coupling to additional structure.

11. The assembly of claim 10, wherein said means for coupling includes a tee fitting having transition fittings on at least two ends thereof.

12. The assembly of claim 11, wherein said tee fitting is adapted to receive a threaded riser pipe.

13. The assembly of claim 11, wherein said tee fitting further comprises a transition fitting.

14. The assembly of claim 10, wherein said means for coupling is selected from an elbow fitting, a tee fitting, a riser adapter, a shear valve adapter, a male adapter and a female adapter.

15. The assembly of claim 10, wherein said transition fitting comprises an interstitial channel aligned along said axial direction.

16. The assembly of claim 15, which further includes a second interstitial channel forming a directional interstitial channel for interstitial communication in a direction other than said axial direction.

17. A pipe coupling assembly, comprising:

- a pipe having an inner wall, an outer wall and an interstitial space between said walls, said pipe terminating in a coupling end defining an axial direction;
- a plastic ferrule attached to said outer wall at said end, said ferrule having an outer annular ring extending from said coupling end in said direction and further having an interstitial channel aligned with said interstitial space in said pipe for presenting an interstitial chamber at said coupling end;
- a metal insert internally expanded into said inner wall and said ferrule at said end, said insert having an inner annular ring extending from said coupling end in said direction;
- a transition fitting for attachment to said ferrule, said fitting including an interstitial channel aligned with said interstitial chamber, an outer seal channel and O-ring seal for sealing engagement with said outer annular ring, and an inner seal channel and O-ring seal for sealing engagement with said inner annular ring; and
- a plastic swivel nut coupling keyed to said ferrule to prevent removal thereof in said direction and for engagement with said fitting to provide coupling engagement between said ferrule and said insert with said fitting.

18. The assembly of claim 17, wherein said ferrule is attached to said outer wall using teeth means formed in said ferrule for deformational engagement with said outer wall.

19. The assembly of claim 17, wherein said insert is attached to said inner wall using teeth means formed in said insert for deformational engagement with said inner wall.

20. The assembly of claim 17, which further includes back-off restrictor means for engaging said coupling means to prevent movement of said coupling means due to vibrations.

* * * * *